United States Patent Office 3,393,607
Patented July 23, 1968

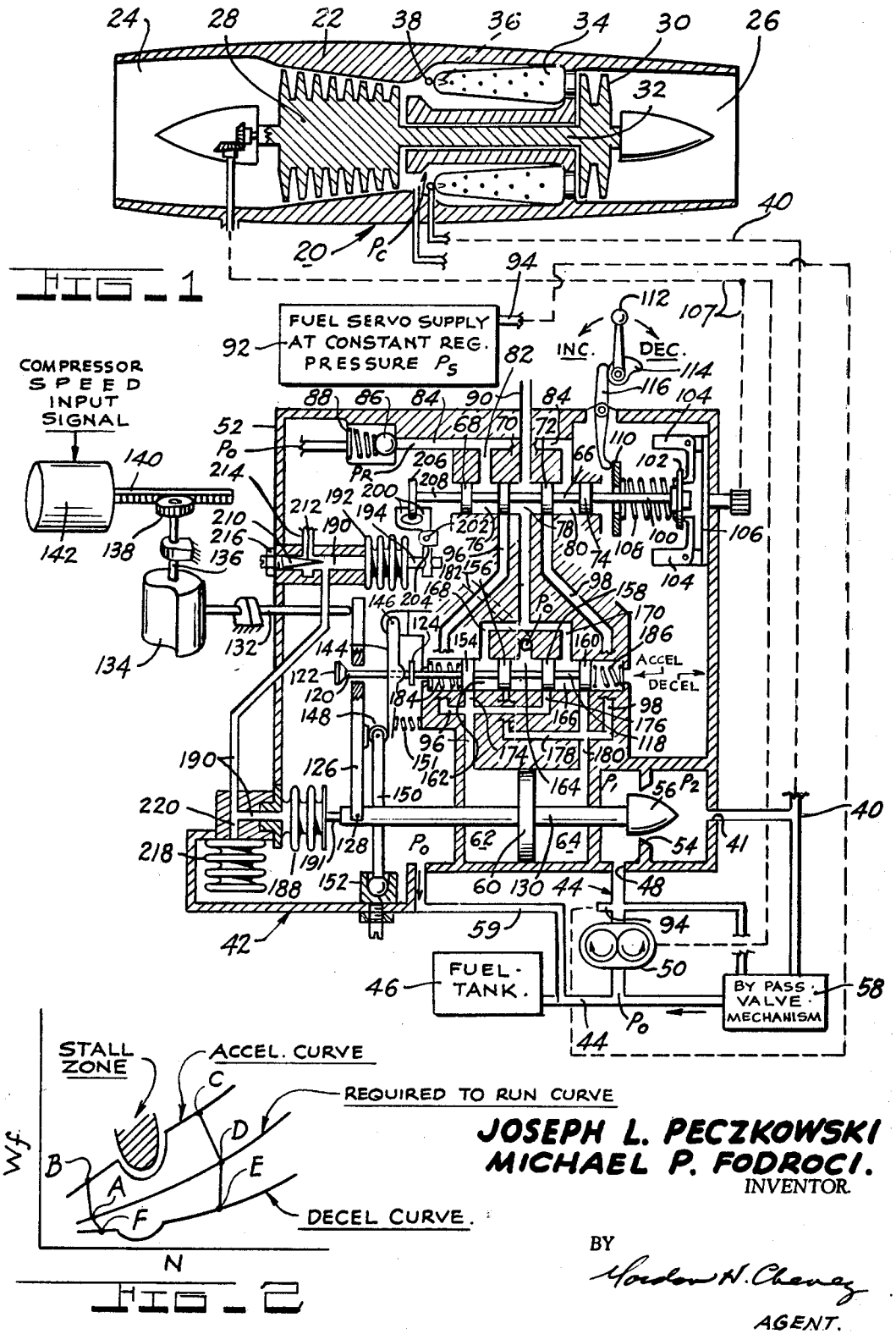

3,393,607
**FLUID PRESSURE OPERATED RATE
FEEDBACK MECHANISM**
Joseph L. Peczowski and Michael P. Fodroci, South Bend,
Ind., assignors to The Bendix Corporation, a corporation of Delaware
Original application Feb. 1, 1966, Ser. No. 538,522, now
Patent No. 3,327,472. Divided and this application
Apr. 6, 1967, Ser. No. 629,011
5 Claims. (Cl. 91—364)

ABSTRACT OF THE DISCLOSURE

Rate feedback mechanism having a fluid circuit supplied fluid at constant pressure via a restricted inlet and wherein a temporary fluid pressure variation is created by expansion or contraction of a feedback bellows vented interiorly to the fluid circuit. A fluid pressure responsive member vented to the fluid circuit responds to the temporary pressure variations thereby generating a rate feedback force. A lag bellows vented interiorly to the fluid circuit temporarily expands or contracts in response to the temporary pressure variations thereby creating a predetermined pressure lag in the fluid circuit.

---

This application is a division of our copending application Ser. No. 538,522 filed Feb. 1, 1966, now Patent Number 3,327,472.

It is an object of the present invention to provide a fluid operated rate feedback mechanism having means for temporarily retaining a generated fluid pressure to introduce a lag in the rate feedback fluid pressure signal.

It is another object of the present invention to provide a fluid operated rate feedback mechanism particularly adapted for use in a hydromechanical fuel control for a combustion engine.

Other objects and advantages of the present invention will be apparent from the following description taken in conjunction with the accompanying drawings wherein:

FIGURE 1 represents a schematic representation of an aircraft jet gas turbine engine and a fuel control system embodying the present invention therefor; and FIGURE 2 represents a series of fuel flow curves having a fuel flow ($W_f$) vs. compressor speed ($n$) relationship.

Referring to the drawings, numeral 20 designates a gas turbine engine having a casing 22 provided with an air inlet 24 and an exhaust nozzle 26. Air from the inlet 24 flows through a compressor 28 driven by a turbine or turbines 30 via a shaft 32 suitably mounted for rotation in casing 22. The pressurized air at pressure $P_c$ discharged from compressor 28 flows to combustion chambers 34 where pressurized fuel injected by fuel nozzles 36 is mixed with the air and burned to provide a flow of hot motive gas. The hot motive gas flows through turbine 30 driving the same and exhausts therefrom to the nozzle 26 from which the gas exits to the atmosphere to provide propelling thrust.

The fuel nozzles 36 are connected to a fuel manifold 38 which receives a pressurized metered flow of fuel via a fuel conduit 40 leading from the outlet 41 of a fuel control 42. A supply fuel conduit 44 connects a fuel tank 46 with inlet 48 of fuel control 42. An engine driven fuel pump 50 connected to conduit 44 serves to pressurize the fuel passing to inlet 48.

The fuel control 42 is provided with a casing 52 having inlet and outlet ports, 48 and 41, respectively, formed therein. Fuel flow from the inlet 48 to the outlet 41 is controlled by a variable area metering orifice 54. A contoured metering valve 56 cooperates with the orifice 54 to establish an effective flow area and thus rate of fuel flow to the combustion chambers 34. A constant predetermined fuel pressure drop $P_1-P_2$ across orifice 54 is maintained by conventional by-pass valve mechanism generally indicated by 58 which is responsive to the pressure drop $P_1-P_2$ across orifice 54 and which functions to divert more or less fuel at pressure $P_1$ depending upon the relative pressure drop error across orifice 54 from the upstream side of orifice 54 back to the inlet of fuel pump 50 at relatively low pressure $P_0$ to thereby cause a decrease or increase in the pressure as required to maintain the constant predetermined drop $P_1-P_2$. A drain passage 59 vents the interior of casing 52 to passage 44 at fuel pump inlet pressure $P_0$.

The metering valve 56 is operatively connected to and actuated by a servo piston 60 slidably carried in casing 52 and separating chambers 62 and 64 which are pressurized by fuel controlled by a governor servo slide valve 66. The governor valve 66 is provided with four lands 68, 70, 72 and 74 which define three annuluses 76, 78, and 80. In a null position of slide valve 66, as shown in the drawings, the annulus 76 communicates with a branch passage 82 leading from a passage 84 which passage 84 also communicates with annulus 80. The passage 84 is vented to relatively low drain fuel pressure, $P_0$, which may be on the order of 50 p.s.i., for example. However, the passage 84 is maintained at a predetermined regulated pressure, $P_R$, which may be on the order of 200 p.s.i., for example, by a spring loaded check valve 86 which, under the influence of spring 88 in combination with the pressure differential $P_R-P_0$ acting across valve 86, is held closed until the fuel at pressure $P_R$ exceeds 200 p.s.i. whereupon the valve 86 opens to vent passage 84 to fuel at pressure $P_0$, thereby reducing $P_R$ to 200 p.s.i. The annulus 78 communicates with a passage 90 leading from a fuel servo supply generally indicated by 92 which maintains a constant supply of fuel at constant pressure $P_s$ which may be on the order of 350 p.s.i., for example. The fuel servo supply is conventional in structure and function and is, therefore, not shown or described in detail. However, it will be understood that the servo supply 92 may receive fuel at relatively high pump discharge pressure $P_1$, from conduit 44 via passage 94 and include a throttling valve, not shown, in flow controlling relationship with the passage 94 and actuated by suitable means responsive to the fuel pressure in passage 90 so as to reduce the pressure $P_1$ to the desired pressure of 350 p.s.i. The lands 70 and 72 are adapted to cooperate with passages 96 and 98, respectively, leading to associated chambers 62 and 64 to control flow thereto from annulus 78. In the null position shown of slide valve 66, passages 96 and 98 are blocked by lands 70 and 72, respectively, which results in stabilization of servo piston 60. The slide valve 66 is provided with a stem 100 having a thrust bearing 102 fixedly secured to the end thereof. A pair of governor weights 104 pivotally secured to a rotatable support 106 are adapted to bear against thrust bearing 102 and exert a force thereagainst which varies as a function of the rotational speed of support 106 in response to the rotational speed of compressor 28 connected thereto via suitable gears and shafting generally indicated by 107. A compression spring 108 interposed between thrust bearing 102 and a spring retainer 110 slidably carried by stem 100 provides a variable reference force in opposition to the force exerted by governor weights 104. The reference force exerted by spring 108 is varied as a function of the position of a control lever 112 which is connected to rotate a cam 114 against which one end of a pivotally mounted lever 116 bears. The opposite end of lever 116 bears against spring retainer 110 and acts to compress spring 108 depending upon the position of cam 114 thereby varying the force exerted by spring 108 accordingly. The slide valve 66 occupies its null position primarily in response to equal and opposite forces generated by spring 108 and opposing governor weights 104 and is displaced from its null position to a degree, depending upon the unbalance between spring 108 and governor weight 104 forces.

The pressurization of servo piston 60 is further controlled by a second slide valve 118 provided with a stem 120 having spaced apart flanged portions 122 and 124 integral therewith. A lever 126 is pivotally secured at one end to a pin 128 carried by a shaft 130 which is fixedly secured to servo piston 60 and slidably carried by casing 52 for axial movement. The opposite end of lever 126 bears against one end of a follower 132 which responds to the contoured surface of an acceleration cam 134. The acceleration cam 134 is carried by a shaft 136 rotatably supported by casing 52 and provided with a pinion 138 fixedly secured thereto. A rack 140 driven by a conventional servomotor generally indicated by 142 is adapted to mesh with pinion 138 and actuate the same in response to the servomotor 142 being activated by an input speed signal derived from compressor 28. The lever 126 is adapted to engage flanged portion 122 during an engine acceleration to a desired reference speed established by the position of control lever 112 to thereby regulate the position of slide valve 118 and control servo piston 60 and metering valve 56 attached thereto accordingly as will be described.

The slide valve 118 is controlled during an engine deceleration to a requested lower speed by a lever 144 pivotally secured at one end to casing 52 by a pin 146. The lever 144 bears against a roller 148 which rides along the lever 126 causing the lever 144 to engage flanged portion 124 and position slide valve 118 accordingly. The roller 148 is rotatably carried on a shaft 150 which is pivotally mounted to an adjustable support 152 threadedly engaged with casing 52 and provided with a slotted end to permit manual adjustment thereof. A compression spring 151 interposed between lever 144 and a fixed support such as casing 52 serves to preload lever 144, roller 148 and lever 126 to thereby hold the same in operative engagement with lever 126 abutting follower 132.

The slide valve 118 is provided with four lands 154, 156, 158 and 160 which define three annuluses 162, 164 and 166. The end annuluses 162 and 166 are in constant communication with passages 168 and 170, respectively, which communicate with a passage 172 leading from annulus 78. Lands 154 and 158 cooperate with passages 174 and 176, respectively, leading to passage 96 and lands 156 and 160 cooperate with passages 178 and 180, respectively, leading to passage 98. In the null position shown of slide valve 118, the lands 154, 156, 158 and 160 block their respective passages 174, 178, 176 and 180 so that flow through the latter cannot occur. However, displacement of slide valve 118 to the left from the null position results in land 154 opening passage 174 to flow from passage 168 via annulus 162, land 156 opening passage 178 to vent the latter to drain fuel pressure, $P_o$, via annulus 164 and passage 182 leading to the interior of casing 52, and lands 158 and 160 overlapping passages 176 and 180, respectively, preventing flow therethrough. Displacement of slide valve 118 to the right from the null position results in land 160 opening passage 180 to flow from passage 170 via annulus 166, land 158 opening passage 176 to vent the same to drain fuel pressure, $P_o$, via annulus 164 and passage 182, and lands 154 and 156 overlapping passages 174 and 178, respectively, preventing flow therethrough. It will be noted that slide valve 118 is in a balanced condition when levers 126 and 144 are out of engagement with their respective flanges 122 and 124, in that the valve 118 is biased to the null position shown by equal and opposite forces derived from fuel at pressure $P_o$ acting against the transverse area of one end of valve 118 in combination with a spring 184 bearing thereagainst in opposition to fuel at pressure $P_o$ acting against the transverse area of the opposite end of valve 118 in combination with a spring 186 bearing thereagainst.

A feedback signal is transmitted from servo piston 60 to the governor slide valve 66 which signal is a function of the rate of movement of the servo piston 60 and thus metering valve 56 attached thereto. To that end, a bellows 188 anchored at one end to casing 52 by any suitable conventional means providing a sealed connection and secured at its opposite movable end to shaft 130 by a stem 191 is vented internally via a passage 190 to the interior of a bellows 192. The bellows 192 is anchored at one end to casing 52 by any suitable conventional means providing a sealed connection and its opposite sealed end is provided with an integral stem 194. The stem 194 is slotted and provided with opposed spaced apart bearing surfaces, such as knife edges 196 and 198 which bear against one end of a lever 200 trapped therebetween. The lever 200 is pivotally mounted on a pin 202 secured to a fixed support 204. The free end of lever 200 is bifurcated and adapted to straddle a flanged end portion 206 of a stem 208 integral with slide valve 66.

A feedback gain adjustment is provided by an adjustable valve member 210 threadedly engaged with casing 52 and provided with a contoured end which cooperates with an orifice 212 in series with a passage 214 leading from passage 190 to the interior of casing 52 at relatively low drain fuel pressure $P_o$. A locknut 216 threadedly engaged with valve member 210 serves to secure the latter in a fixed position. A bellows 218 anchored at one end to casing 52 is vented interiorly to passage 190 via a passage 220.

Operation

Initially, it will be assumed that the engine is stable in operation at a selected speed corresponding to the position of the control lever 112 in which case the governor slide valve 66 and slide valve 118 are in the null position thereby controlling the servo piston 60 and attached metering valve 56 to a corresponding stable position as shown in the drawing.

Now, assuming the control lever 112 to be actuated to a position requesting a higher than existing engine speed, the governor spring 108 is compressed accordingly, thereby imposing a force against thrust bearing 102 which overcomes the force of governor weights 104, thereby biasing slide valve 66 to the right as viewed in FIGURE 1. The land 72 uncovers passage 98 thereby venting fuel at relatively high pressure $P_s$ from annulus 78 to passage 98 and chamber 64 adjacent servo piston 60 while the land 70 uncovers passage 96 thereby venting the same to fuel at relatively low pressure $P_R$ via annulus 76. The resulting pressure differential $P_s - P_R$ differential generated across servo piston 60 urges the latter to the left causing metering valve 56 to move in an opening direction accordingly. The piston 60 has integrating action in that its rate of movement is proportional to the relative speed error defined by the degree of displacement of slide valve 66 from the null position which determines the rate of flow into or out of chambers 62 and 64 depending upon the direction of movement of slide valve 66. The resulting increase in fuel flow to the combustion chambers 34, as indicated by line A to B in FIGURE 2, is substantially instantaneous and engine acceleration lags the increase in fuel flow to an extent determined by the response characteristics of the engine. The lever 126 being engaged with follower 132 is pivoted in a clockwise direction in response to the movement of piston 60 resulting in lever 126 engaging flange 122 whereupon slide valve 118 is displaced to the left from the null position accordingly. It will be understood that the cam 134 does not move to any significant extent during the aforementioned increase in fuel flow by virtue of the aforementioned lag characteristic of the engine. Thus the one end of lever 126 bearing against follower 132 is referenced to the cam 134 in accordance with the existing speed of compressor 28 which may be considered only slightly in excess of that existing at the time of the acceleration request. The movement of slide valve 118 from its null position results in a control transfer function whereupon the integrating action of piston 60 is converted to proportional action. To that end, the governor slide valve 66 operation is overridden by the slide valve 118 which, as a result of the abovementioned displacement to the left, causes land 154 to open passage 174 thereby venting fuel at pressure $P_s$ from annulus 162 to chamber 62 and land 156 to open passage 178 thereby venting fuel from the latter to annulus 164 at drain fuel pressure $P_o$. The flow introduced through passage 98 from annulus 78 to chamber 64 by the aforementioned unbalanced condition of governor slide valve 66 is reduced to the extent of flow vented through passage 178 to annulus 164 of slide valve 118 which results in a corresponding decrease in fuel pressure in chamber 64 to that necessary to balance the opposing pressure of 200 p.s.i. in chamber 62 whereupon servo piston 60 and attached metering valve 56 are stabilized. Stabilization of metering valve 56 establishes a rate of fuel flow to the combustion chambers 34 in accordance with a predetermined acceleration fuel flow schedule as a function of engine speed by virtue of cam 134. Assuming the engine now begins to accelerate in response to the increased fuel flow, the cam 134 will be rotated in response to the increasing speed of compressor 28 causing follower 132 to urge lever 126 in a clockwise direction about pin 128 permitting slide valve 118 to move toward its null position causing a decrease in flow past land 154 from annulus 162 to passage 174 and a decrease in flow past land 156 from passage 178 to annulus 164. The resulting increase in pressure in chamber 64 overcomes the opposing constant pressure in chamber 62 and servo piston 60 is actuated accordingly in a direction to open metering valve 56 thereby producing an increased rate of fuel flow to the combustion chambers 34. Movement of the servo piston 60 causes lever 126 to pivot clockwise about the end of follower 132 which results in opening movement of slide valve 118 causing a drop in pressure in chamber 64 as necessary to balance the opposing constant pressure of 200 p.s.i. in chamber 62 thereby stabilizing servo piston 60 and attached metering valve 56 at a new position corresponding to the position of cam 134 as a function of the increase in speed of compressor 28 to produce the desired increase in fuel flow to the combustion chambers 34. It will be understood that the rotation of cam 134 is substantially continuous since the compressor 28 speed changes occur at a relatively rapid rate during an engine acceleration such that the servo piston 60 and attached metering valve 56 may be considered constantly in motion thereby producing a smooth transition in fuel flow as engine acceleration progresses.

It will be recognized by those persons skilled in the art that certain upper limits on fuel flow to a gas turbine engine are defined by maximum temperatures which the engine can tolerate during an acceleration and, over a certain range of engine speeds characterized as a compressor stall or surge zone, even more severe limits may be placed on fuel flow to the engine if stall or surge is to be avoided. A generalized stall or surge zone is shown in FIGURE 2 which also illustrates how an acceleration fuel schedule indicated by the line B to C is modified to circumvent stall or surge. Thus, as the engine accelerates, it may be necessary to reverse the direction of movement of the metering valve 56 to reduce the rate of fuel flow to the engine at certain compressor speeds or over a range of compressor speeds in accordance with established predetermined fuel flow limits represented by the contour of cam 134. Such a reversal of movement of metering valve 56 presents a problem in that the fuel pressure $P_R$ to which the servo fuel pressure $P_s$ is referenced must be sufficient to rapidly overcome the opposing pressure $P_s$ and generate adequate force to effect a fast response of servo piston 60. To that end, it will be noted that the present invention utilizes a reference fuel pressure, $P_R$, of approximately 200 p.s.i. which is midway between the servo supply fuel pressure, $P_s$, of 350 p.s.i. and the drain fuel pressure, $P_o$, of 50 p.s.i.

Now, in accordance with the abovementioned acceleration request, it will be assumed that a reduction in fuel flow at a certain compressor speed in the range of compressor speed defining the stall or surge zone, is called for by a depression in the contoured surface of cam 134 corresponding to the certain compressor speed. The follower 132 responds to the depressed contour of cam 134 allowing lever 126 to pivot counterclockwise about pin 128 and carry valve 118 to the left which results in lands 156 and 154 opening passages 178 and 174, respectively, to a correspondingly greater extent. The servo fuel pressure $P_s$ in chamber 64, thus being vented to drain fuel pressure $P_o$, decreases below the opposing reference fuel pressure $P_R$ and the resulting $P_R-P_s$ pressure differential arrests movement of servo piston 60 and urges the latter in the opposite direction thereby actuating metering valve 56 in a closing direction to reduce fuel flow accordingly. It will be noted the increased flow area of passage 174 caused by land 154 moving relative thereto permits an immediate supply of fuel from annulus 162 to chamber 62, thereby maintaining the pressure level $P_R$ in chamber 162 at the required value to compensate for the increasing volume of chamber 62 as reverse movement of servo piston 60 occurs. Obviously, further depressions of cam 134 will effect continued movement of metering valve 56 in a closing direction in the above mentioned manner whereas a subsequent rise in the contour of cam 134 will result in valve 118 moving toward its null position with a corresponding decrease in flow area of passages 174 and 178 to thereby increase the pressure $P_s$ in chamber 64 to overcome the opposing regulated constant pressure $P_R$ in chamber 62 whereupon the servo piston 60 is pressurized accordingly to urge metering valve 56 in an opening direction and increase fuel flow.

Movement of piston 60 to the left as viewed in the drawing results in compression of bellows 188 and a rise is fuel pressure in passage 190, bellows 218 and 192. The force generated by the rising fuel pressure within bellows 192 acting on the exposed inner surface of the movable end of bellows 192 is transmitted through lever 200 and flange 20 to slide valve 66 in opposition to the force of spring 108. The pressure effect tending to expand bellows 218 and 192 increases in proportion to increasing velocity of piston 60. It will be recognized that the relatively small force generated by bellows 192 is of negligible effect in overcoming the spring 108 when the force unbalance between spring 108 and governor weights 104 is large as is the case during a normal acceleration over a relatively large speed range. However, as the engine approachs the requested speed and the force unbalance between governor weights 104 and spring 108 becomes smaller the speed anticipation effect derived from the force produced by bellows 192 becomes significant in temporarily reducing the abovementioned force unbalance. The gain or increase in pressure in passage 190 for a given velocity of piston 60 may be adjusted as desired by suitable adjustment of valve member 210 which controls the escape of fuel from passage 190 to drain fuel pressure $P_o$. The bellows 218 operates as a fluid pressure storing device to produce a delayed pressure effect to bellows 192 as the requested compressor speed is approached. Also, the expansion of bellows 218 in response to the aforementioned pressure rise in passage 190 reduces the back pressure against bellows 188 thereby permitting faster response of servo piston 60 to the controlling pressure differential thereacross.

Governor action occurs as the compressor speed approaches the requested speed point established by the position of control lever 112. Governor break occurs at point C in FIGURE 2 where the governor weights 104 force in combination with the force derived from bellows 192 overcomes the force of spring 108 causing the slide valve 66 to move to the left toward its null position as viewed in FIGURE 1 whereupon lands 70 and 72 cause a reduction in flow area of passages 96 and 98, respectively. The resulting rise in pressure in chamber 62 and decrease in pressure in chamber 64 causes the servo piston 60 to reverse its direction of motion and drive metering valve 56 in a closing direction which results in fuel flow decreasing as indicated by the line from C to D in FIGURE 2. It will be noted that the force derived from bellows 192 is maintained for a limited time after the piston 60 motion decreases and reverses in the abovementioned matter. As the pumping action of bellows 188 diminishes, the bellows 218 tends to contract forcing fuel back into passage 190 thereby maintaining the pressure level in bellows 192 in spite of the decreased pumping action of bellows 188. As the bellows 218 approaches its collapsed position, the pressure level in passage 190 and bellows 192 decreases to drain pressure $P_o$ by virtue of the bleed action of valve 210 thereby eliminating the speed anticipation force effect derived from bellows 192 which augments the governor weights 104 force. The governor slide valve 66 is subsequently controlled to its null position in response to equalized forces between spring 108 and governor weights 104 whereupon the compressor speed is stabilized accordingly at the requested speed, point D, on the required to run curve on FIGURE 2.

As the servo piston 60 drives metering valve in the closing direction, the lever 126 is pivoted in a counterclockwise direction about its point of engagement with follower 132 thereby releasing flange 122 which, in turn, allows slide valve 118 to return to its null position under the influence of spring 184. Thus, the lands 154 and 156 block passages 174 and 178, respectively, rendering slide valve 118 inoperative with reference to the pressures in chambers 62 and 64 allowing the governor slide valve 66 to assume control over the pressures in chambers 62 and 64 during the abovementioned governor operation.

A deceleration of the engine is initiated by movement of control lever 112 to a position requesting a lower than existing speed in response to which the governor slide valve 66 is moved toward the left from its null position by virtue of the force by governor weights overcoming the force of spring 108. The passage 96 is vented by land 70 to annulus 78 at servo pressure $P_s$ and passage 98 is vented by land 72 to annulus 80 at regulated pressure $P_R$. The resulting pressure differential $P_s - P_R$ across piston 60 urges the latter in a direction to close metering valve 56 and reduce fuel flow substantially instantaneously as indicated by the line from point D to point E in FIGURE 2. As the piston 60 moves carrying lever 126 in a counterclockwise direction with follower 132 as a fulcrum, the roller 148 is actuated against lever 144 causing the latter to engage flange 124 to which, in turn, results in movement of slide valce 118 to the right from its null position. The land 158 vents passage 176 to annulus 164 at drain fuel pressure $P_o$ while land 160 vents passage 180 to annulus 166 at servo fuel pressure $P_s$. The cam 134 is rotated in response to the decreasing compressor speed causing follower 132 to retrace the positions occupied during the aforementioned acceleration assuming the deceleration is over the same range of compressor speeds as the acceleration. The lever 126 follows cam 132 and pivots about pin 128 in a clockwise or counterclockwise direction depending upon the contour variations of cam 134 as described in the aforementioned acceleration. The lever 144 follows roller 148 in response to movement of lever 126 causing the valve 118 to move further from or closer to its null position in a manner similar to that occurring during the aforementioned acceleration but in a reverse sense. Thus, as in the case of the abovementioned acceleration, the servo piston 60 may be reversed in its direction of movement by the action of slide valve 118 to provide a deceleration fuel flow schedule which bears a predetermined percentage relationship of the acceleration fuel flow. The deceleration fuel schedule is represented by the line from point E to point F in FIGURE 2. The percentage relationship is a function of the working lever arm ratio of levers 126 and 144 which ratio may be varied to suit requirements by adjustment of the roller 148 as desired.

The bellows 188 provides a rate feedback signal to the bellows 192 in a manner similar to that described heretofore in connection with movement of piston 60 to the left but in a reverse sense. The movement of servo piston 60 to the right results in an expansion of bellows 188 which tends to cause a decrease in fuel pressure in passage 191. The bellows 192 and 218 tend to compress in response to the decrease in pressure with the bellows 218 providing a lag in the feedback pressure signal to bellows 192. The decrease in fuel pressure in bellows 192 results in a corresponding force exerted by bellows 192 on lever 200 and thus governor slide valve 66 in opposition to the governor weights 104 which reduces the force on balance on slide valve 66 accordingly tending to displace slide valve 66 toward its null position as viewed in FIGURE 1 as the requested lower speed indicated by point A (FIGURE 2) is approached. The lagged pressure effect of bellows 218 dissipates as bellows 218 assumes its normal position with the pressure in passage 190 and bellows 192 stabilizing at drain pressure $P_o$ by virtue of the bleed action of valve 210. The abovementioned motion of slide valve 66 toward its null position causes lands 70 and 72 to reduce the effective flow area of passages 96 and 98, respectively, causing a decrease in pressure in chamber 62 and a rise in pressure in chamber 64 whereupon the servo piston 60 is stopped and reversed to cause opening movement of metering valve 56. As the piston 60 moves to the left to open metering valve 56 and increase fuel flow along the line from point F to point A in FIGURE 2, the lever 126 is pivoted clockwise about its point of engagement with follower 132 causing lever 144 to release flange 124. The slide valve 118 returns to its null position in response to spring 186. The governor slide valve 66 is nulled in response to the governor weights 104 force balancing the spring 108 force as the force of bellows 218 dissipates. The piston 60 and metering valve 56 are stabilized accordingly thereby maintaining fuel flow at the required value to maintain the requested compressor speed at point A in FIGURE 2.

The governor slide valve 66 responds to variations in the force of governor weights 104 caused by the compressor speed deviating from the governed speed which response results in control over the pressures in chamber 62 and 64 in the aforementioned manner to modify the position of servo piston 60 and cause a corresponding increase or decrease in fuel flow depending upon the relative speed error. The movement of servo piston 60 produces expansion or contraction of bellows 188 depending on the direction of motion of piston 60 thereby generating the aforementioned rate feedback force which is applied to slide valve 66 tending to restore the same to its null position. Such compressor speed variations are of a temporary nature and require relatively small fuel flow corrections to maintain the required governed speed. The slide valve 118 is not disturbed from its null position thereby remaining ineffective during the abovementioned governor action for off speed errors.

While only one embodiment of the present invention is shown and described, it will be recognized by those persons skilled in the art that various modifications may be made in the structure shown and described without departing from the scope of applicants' invention.

We claim:

1. Fluid pressure operated rate feedback apparatus for use in a control system having a movable output member responsive to the position of a control member actuated by an input control force, said rate feedback apparatus comprising:
- first means defining a first variable volume fluid chamber operatively connected to the output member and adapted to increase or decrease in volume at a rate dependent upon the direction and rate of movement of the output member;
- fluid pressure responsive means operatively connected to the control member for imposing a force thereagainst tending to augment the input control force;
- second means defining a second variable volume chamber having resilient force producing means tending to resist expansion and contraction thereof;
- a fluid source having a substantially constant fluid pressure;
- first passage means interconnecting said first and second variable volume chambers and having a fluid connection with said pressure responsive means; and
- a restricted passage connecting said first passage means with said source of fluid;
- said pressure responsive means being responsive to a temporary change in fluid pressure in said first passage means caused by the volume change of said first variable volume chamber in response to movement of the output member;
- said second variable volume chamber expanding or contracting in response to an increase or decrease, respectively, in fluid pressure in said first passage means and operative to release said pressurized fluid to said first passage means to sustain the fluid pressure acting against said pressure responsive means as the rate of change of volume of said first variable volume diminishes.

2. Fluid pressure operated feedback apparatus as claimed in claim 1 wherein:
said second means is a bellows vented interiorly to said first passage means.

3. Fluid pressure operated feedback apparatus as claimed in claim 1 wherein:
said first and second means are bellows.

4. Fluid pressure operated feedback apparatus as claimed in claim 1 wherein:
said restricted passage includes an adjustable restriction for controlling the effective flow area thereof and thus the gain relationship between fluid pressure in said first passage means and volume change of said first variable volume chamber.

5. Fluid pressure operated feedback apparatus as claimed in claim 1 wherein:
said fluid pressure responsive means is a bellows vented interiorly to said first passage means.

References Cited

UNITED STATES PATENTS

| | | | |
|---|---|---|---|
| 2,285,540 | 6/1942 | Stein et al. | 91—388 |
| 2,989,950 | 6/1961 | Lockman | 91—388 |
| 3,171,330 | 3/1965 | McCombs | 91—388 |

PAUL E. MASLOUSKY, *Primary Examiner.*